(12) United States Patent
Otsuka

(10) Patent No.: US 10,412,238 B2
(45) Date of Patent: Sep. 10, 2019

(54) RECORDING APPARATUS

(71) Applicant: SEIKO EPSON CORPORATION, Tokyo (JP)

(72) Inventor: Kazuo Otsuka, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 29 days.

(21) Appl. No.: 15/600,276

(22) Filed: May 19, 2017

(65) Prior Publication Data

US 2017/0346960 A1 Nov. 30, 2017

(30) Foreign Application Priority Data

May 27, 2016 (JP) .................. 2016-105943

(51) Int. Cl.
| | |
|---|---|
| *B41J 29/02* | (2006.01) |
| *B41J 29/13* | (2006.01) |
| *H04N 1/00* | (2006.01) |
| *G03G 21/16* | (2006.01) |
| *G03G 15/00* | (2006.01) |
| *B41J 13/00* | (2006.01) |
| *B65H 85/00* | (2006.01) |
| *B41J 3/60* | (2006.01) |

(52) U.S. Cl.
CPC ...... *H04N 1/00275* (2013.01); *B41J 13/0045* (2013.01); *B41J 29/02* (2013.01); *B41J 29/13* (2013.01); *B65H 85/00* (2013.01); *G03G 15/6514* (2013.01); *G03G 15/6552* (2013.01); *G03G 21/168* (2013.01); *G03G 21/1623* (2013.01); *H04N 1/00519* (2013.01); *H04N 1/00602* (2013.01); *B41J 3/60* (2013.01); *G03G 21/1647* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,082,269 A | * | 1/1992 | Hirayama | B65H 15/00 271/186 |
| 6,382,617 B1 | * | 5/2002 | Yen | B41J 13/103 271/126 |
| 7,431,279 B2 | * | 10/2008 | Budelsky | B41J 13/103 271/3.14 |
| 7,451,972 B2 | * | 11/2008 | Fukada | B65H 1/04 271/9.01 |

(Continued)

FOREIGN PATENT DOCUMENTS

JP 2014-208428 11/2014

*Primary Examiner* — Henok D Legesse
(74) *Attorney, Agent, or Firm* — Workman Nydegger

(57) ABSTRACT

A recording apparatus, comprising: an apparatus body; a recording device that is provided inside the apparatus body and performs recording on a medium; a supporting tray that is switchable between a drawn-out state and a housed state and, when in the drawn-out state, supports the medium that is to be fed toward the recording device, the drawn-out state being a state of being drawn out from the apparatus body, the housed state being a state of being housed in the apparatus body; and a unit that is detachably attached to the apparatus body and includes a reverse roller for reverse the medium, wherein the supporting tray has a portion that is configured to be on a path of attachment and detachment of the unit when in the housed state.

10 Claims, 17 Drawing Sheets

(56) References Cited

U.S. PATENT DOCUMENTS

| | | | | |
|---|---|---|---|---|
| 8,118,301 B2 * | 2/2012 | Fujii | ............... | B41J 13/106 271/207 |
| 8,210,516 B2 * | 7/2012 | Acton | ............... | B41J 13/025 271/3.14 |
| 8,262,079 B2 * | 9/2012 | Uchino | ............... | B65H 3/0684 271/10.03 |
| 8,508,819 B2 * | 8/2013 | Asada | ............... | B41J 13/10 271/4.01 |
| 8,585,051 B2 * | 11/2013 | Arakane | ............... | B65H 29/00 271/176 |
| 8,770,572 B2 * | 7/2014 | Uchino | ............... | B65H 5/062 271/9.09 |
| 9,126,779 B2 * | 9/2015 | Osakabe | ............... | B65H 3/0684 |
| 9,212,015 B2 * | 12/2015 | Arakane | ............... | B65H 3/0684 |
| 9,427,982 B2 * | 8/2016 | Ohashi | ............... | B41J 11/04 |
| 9,479,660 B2 * | 10/2016 | Osakabe | ............... | H04N 1/00567 |
| 2005/0073085 A1 * | 4/2005 | Fukada | ............... | B65H 1/04 271/9.09 |
| 2005/0253323 A1 * | 11/2005 | Fujita | ............... | B65H 1/04 271/9.09 |
| 2007/0002116 A1 * | 1/2007 | Budelsky | ............... | B41J 13/103 347/104 |
| 2011/0001284 A1 * | 1/2011 | Ohtsuki | ............... | B65H 5/26 271/162 |
| 2011/0097126 A1 * | 4/2011 | Kimura | ............... | B65H 29/125 399/405 |
| 2013/0082437 A1 * | 4/2013 | Asada | ............... | B41J 13/103 271/109 |
| 2013/0134016 A1 * | 5/2013 | Uchino | ............... | B65H 5/062 198/722 |
| 2014/0292976 A1 * | 10/2014 | Ohashi | ............... | B41J 11/04 347/104 |
| 2014/0292986 A1 | 10/2014 | Oki et al. | | |
| 2015/0003860 A1 * | 1/2015 | Shin | ............... | G03G 15/6529 399/98 |

\* cited by examiner

RECORDING APPARATUS

CROSS REFERENCES TO RELATED APPLICATIONS

The entire disclosure of Japanese Patent Application No. 2016-105943, filed May 27, 2016 is expressly incorporated by reference herein.

BACKGROUND

1. Technical Field

The present invention relates to a recording apparatus that performs recording on a medium. More particularly, it relates to a recording apparatus provided with a reverse roller for reverse a medium fed from a medium container.

2. Related Art

The following structure is adopted in some facsimile, printing, and other kinds of recording apparatuses. As disclosed in JP-A-2014-208428, a recording apparatus back-feeds a sheet of paper after recording, turns over the sheet around a large-diameter reverse roller (intermediate roller 24 in JP-A-2014-208428), and transports the sheet toward a transportation device (pair made up of a driving transportation roller 26 and a driven transportation roller 27 in JP-A-2014-208428) provided in front of a recording head again.

In the recording apparatus disclosed in JP-A-2014-208428, members such as a reverse roller constituting a reverse path are integrated in a form of a unit (unit 12 for double-sided recording). The double-side unit is detachably attached to the body of the apparatus. A sheet transportation path provided inside the apparatus becomes exposed when the double-side unit is detached from the body of the apparatus. By this means, a user is able to remove a jammed sheet of paper in a case of a jam.

The double-side unit disclosed in JP-A-2014-208428 is provided with a paper support. The paper support is able to be put into two states: a state of being housed in the double-side unit and a state of being drawn out from the double-side unit. The drawn-out paper support is able to be put into a tilted position. At the tilted position, it supports sheets of paper that are to be fed manually.

A double-side unit needs to be detachable for troubleshooting a paper jam. On the other hand, in order to avoid a risk of damage, for example, damage due to dropping, careless detachment of a double-side unit should be avoided because a double-side unit includes exposed members that constitute a sheet transportation path and are, in many cases, low in strength. Careless detachment of a double-side unit by a person other than a user of a recording apparatus, that is, by a person who is not skilled in handling the recording apparatus, should be avoided, except for an unavoidable situation. However, if a dedicated means is provided exclusively for the purpose of avoiding such a problem, it will result in an increase in cost.

SUMMARY

An advantage of some aspects of the invention is, in a structure that includes a unit that is detachably attached to the body of an apparatus and includes a reverse roller for reverse a medium, to prevent careless detachment of the unit while avoiding an increase in cost.

A recording apparatus according to a first mode of the invention comprises: an apparatus body; a recording device that is provided inside the apparatus body and performs recording on a medium; a supporting tray that is switchable between a drawn-out state and a housed state and, when in the drawn-out state, supports the medium that is to be fed toward the recording device, the drawn-out state being a state of being drawn out from the apparatus body, the housed state being a state of being housed in the apparatus body; and a unit that is detachably attached to the apparatus body and includes a reverse roller for reverse the medium, wherein the supporting tray has a portion that is configured to be on a path of attachment and detachment of the unit when in the housed state.

In this mode, the supporting tray has a portion that is configured to be on the path of attachment and detachment of the unit when in the housed state. Therefore, the supporting tray obstructs the detachment of the unit when in the housed state, that is, when the apparatus is not in use. The obstruction reduces a risk of excessively-easy careless detachment of the unit. Moreover, since the supporting tray serves as an obstruction to excessively-easy careless detachment of the unit, as compared with a structure in which a dedicated means is provided for reducing a risk of careless detachment of the unit, it is possible to suppress an increase in cost.

A second mode of the invention is that, in the first mode, when in the housed state, the portion, of the supporting tray, configured to be on the path of attachment and detachment of the unit is located behind the unit attached. This mode further reduces a risk of careless detachment of the unit because, when in the housed state, the portion, of the supporting tray, configured to be on the path of attachment and detachment of the unit is located behind the unit attached.

A third mode of the invention is that, in the second mode, when in the housed state, rear of the unit attached is covered by the portion, of the supporting tray, configured to be on the path of attachment and detachment of the unit, and the apparatus body and the supporting tray constitute exterior of the apparatus.

In this mode, when in the housed state, rear of the unit attached is covered by the portion, of the supporting tray, configured to be on the path of attachment and detachment of the unit, and the apparatus body and the supporting tray constitute exterior of the apparatus, in other words, the supporting tray serves as an exterior constituent member. Therefore, it is possible to reduce the cost of the apparatus.

A fourth mode of the invention is that, in any of the first, second, and third modes, the unit includes an operation device that unlocks attachment of the unit to the apparatus body; and, when in the housed state, the operation device of the unit attached is covered by the portion, of the supporting tray, configured to be on the path of attachment and detachment of the unit.

In this mode, the unit includes an operation device that unlocks attachment of the unit to the apparatus body; and, when in the housed state, the operation device of the unit attached is covered by the portion, of the supporting tray, configured to be on the path of attachment and detachment of the unit. The operation device is not touchable when the supporting tray is in the housed state. Therefore, with this structure, it is possible to further reduce a risk of careless detachment of the unit.

A fifth mode of the invention is that the recording apparatus according to any of the first to fourth modes further comprises: a keeping device that keeps the drawn-out state of the supporting tray when the unit is in a state of being detached from the apparatus body.

In this mode, since the recording apparatus further comprises a keeping device that keeps the drawn-out state of the supporting tray when the unit is in a state of being detached from the apparatus body, the supporting tray is not obstructive in the process of attachment of the unit. Therefore, the attachment of the unit is easy.

A sixth mode of the invention is that, in the fifth mode, the keeping device includes a stopper that is able to come into abutting contact with the unit and is urged in a direction of advancing toward a state transition path that is a path for switching from the drawn-out state to the housed state of the supporting tray; the stopper is in abutting contact with the unit and is retracted away from the state transition path when the unit is in a state of being attached to the apparatus body; and the stopper advances into the state transition path when the unit is detached from the apparatus body. In this mode, since the stopper is used as a constituent of the keeping device, it is possible to simplify the structure of the keeping device and reduce cost.

A seventh mode of the invention is that, in the fifth or sixth mode, when in the drawn-out state, the supporting tray is able to switch between a tilted position that is a position for supporting the medium and an erect position that is a position for transition to the housed state; and, when in the tilted position, the supporting tray is able to remain in the drawn-out state irrespective of a state of the keeping device.

When in the tilted position, that is, the position for supporting the medium, the supporting tray is able to remain in the drawn-out state irrespective of the state of the keeping device. Therefore, in this mode, it is possible to always support the medium properly irrespective of the state of the keeping device.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
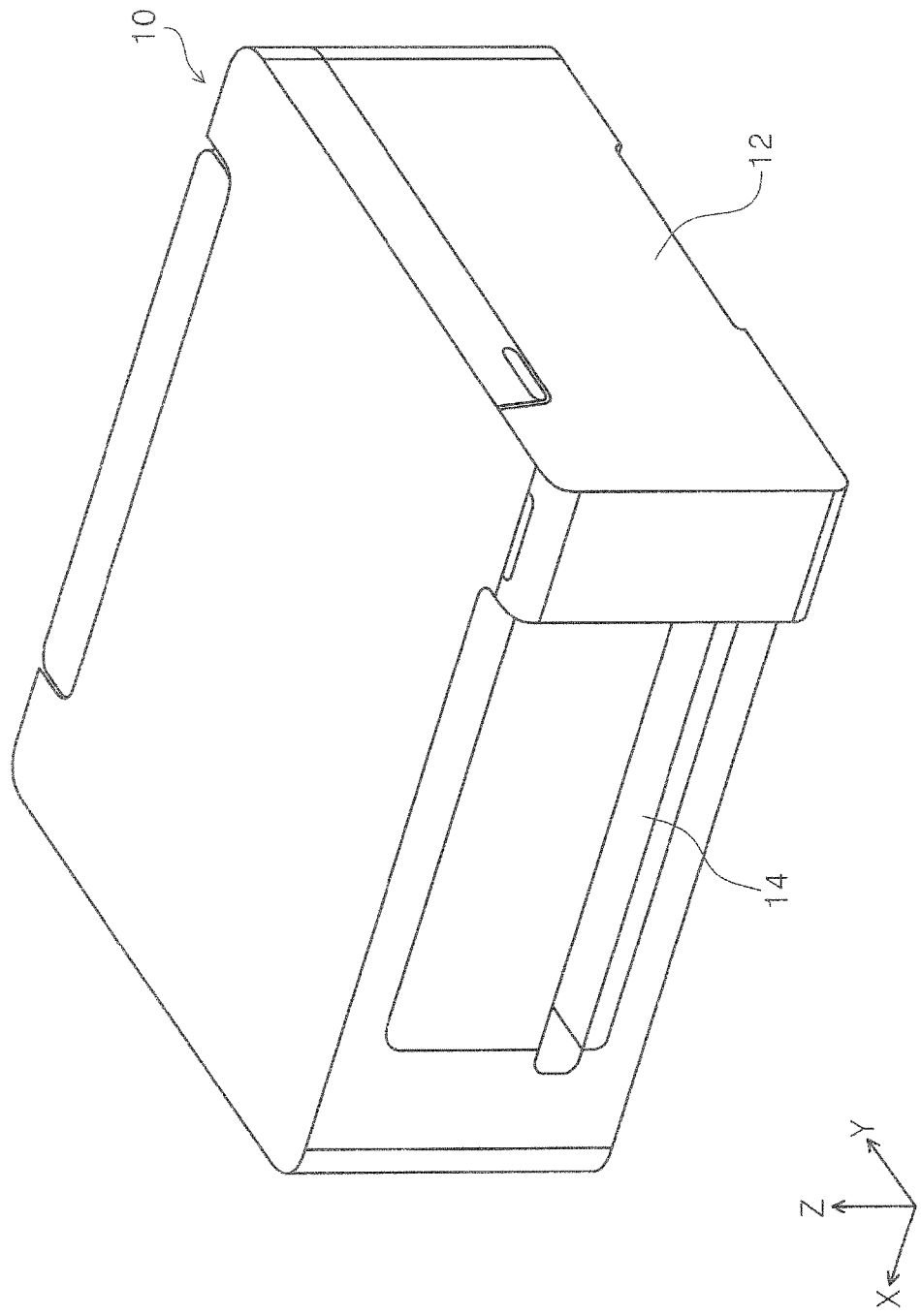
FIG. 1 is a perspective view of a printer according to an embodiment of the invention, with a supporting tray housed in the rear of the body of the printer.

With reference to the accompanying drawings, exemplary embodiments of the present invention will now be explained. In each embodiment, the same reference numerals are assigned to the same components, and they are explained in the first embodiment only. An explanation of them is omitted in the subsequent embodiments.

Figure 2:
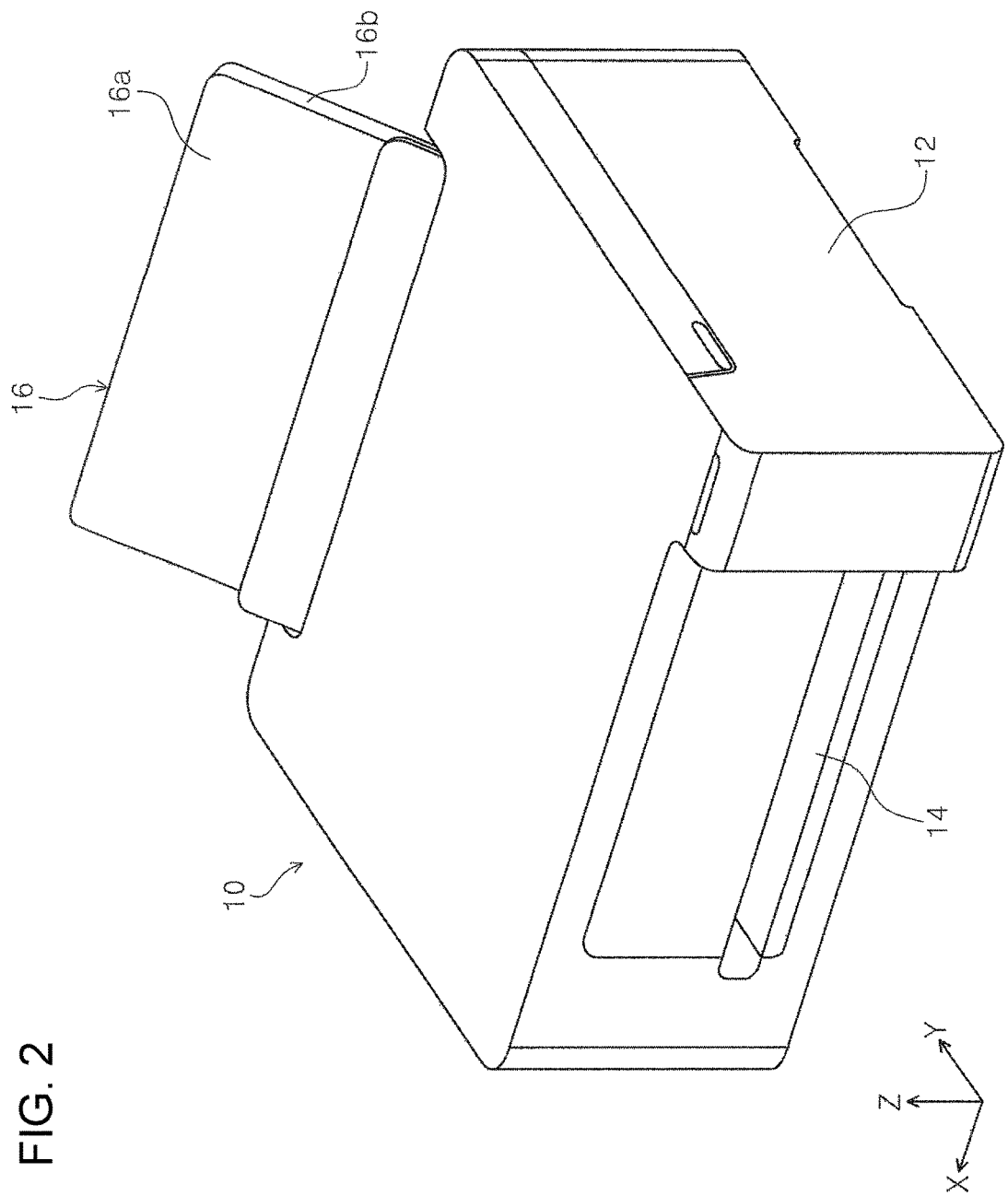
FIG. 2 is a perspective view of a state after the supporting tray has been drawn out from the body of the printer.
Figure 3:
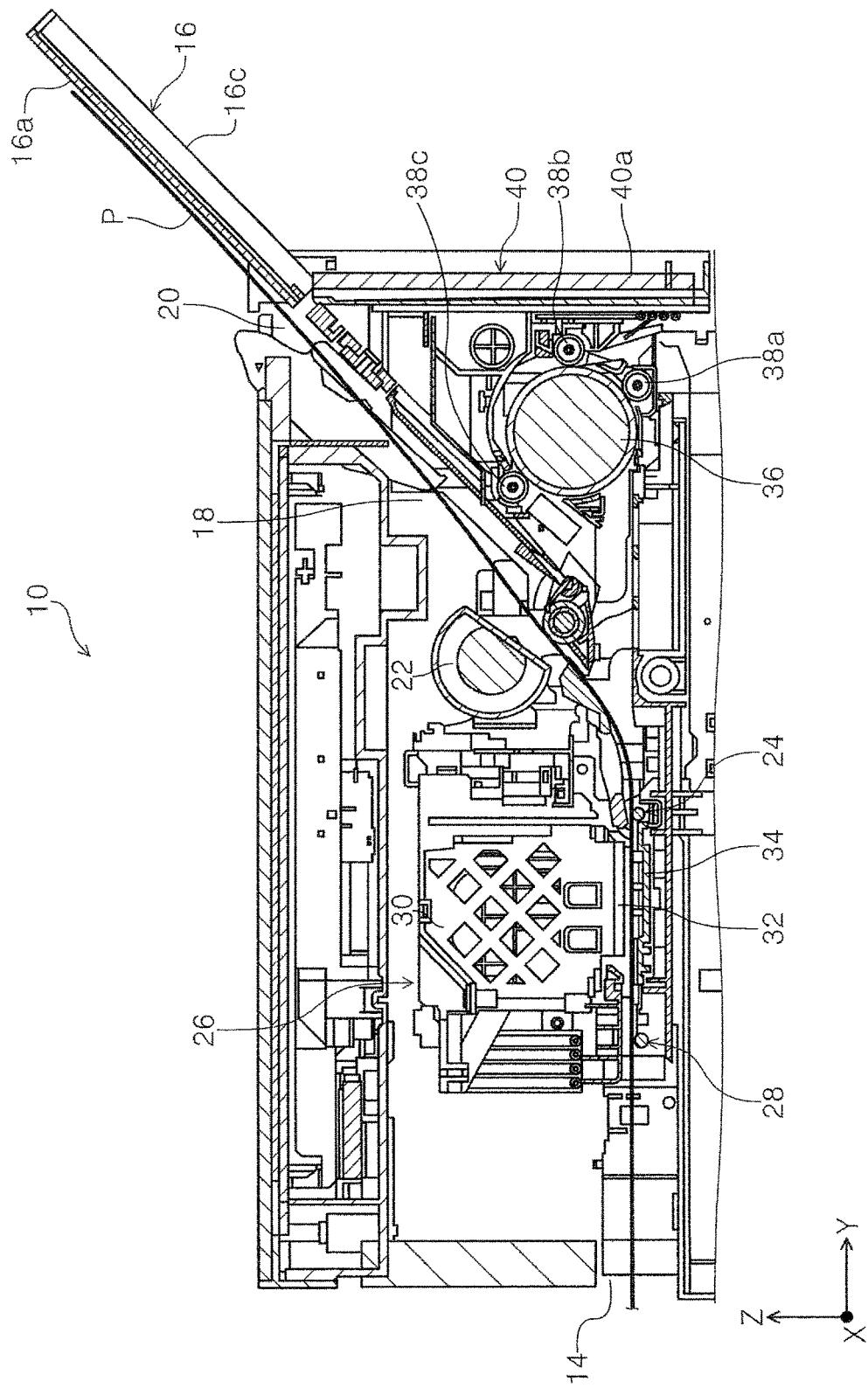
FIG. 3 is a side sectional view of a medium transportation path in a printer according to an embodiment of the invention.
Figure 4:
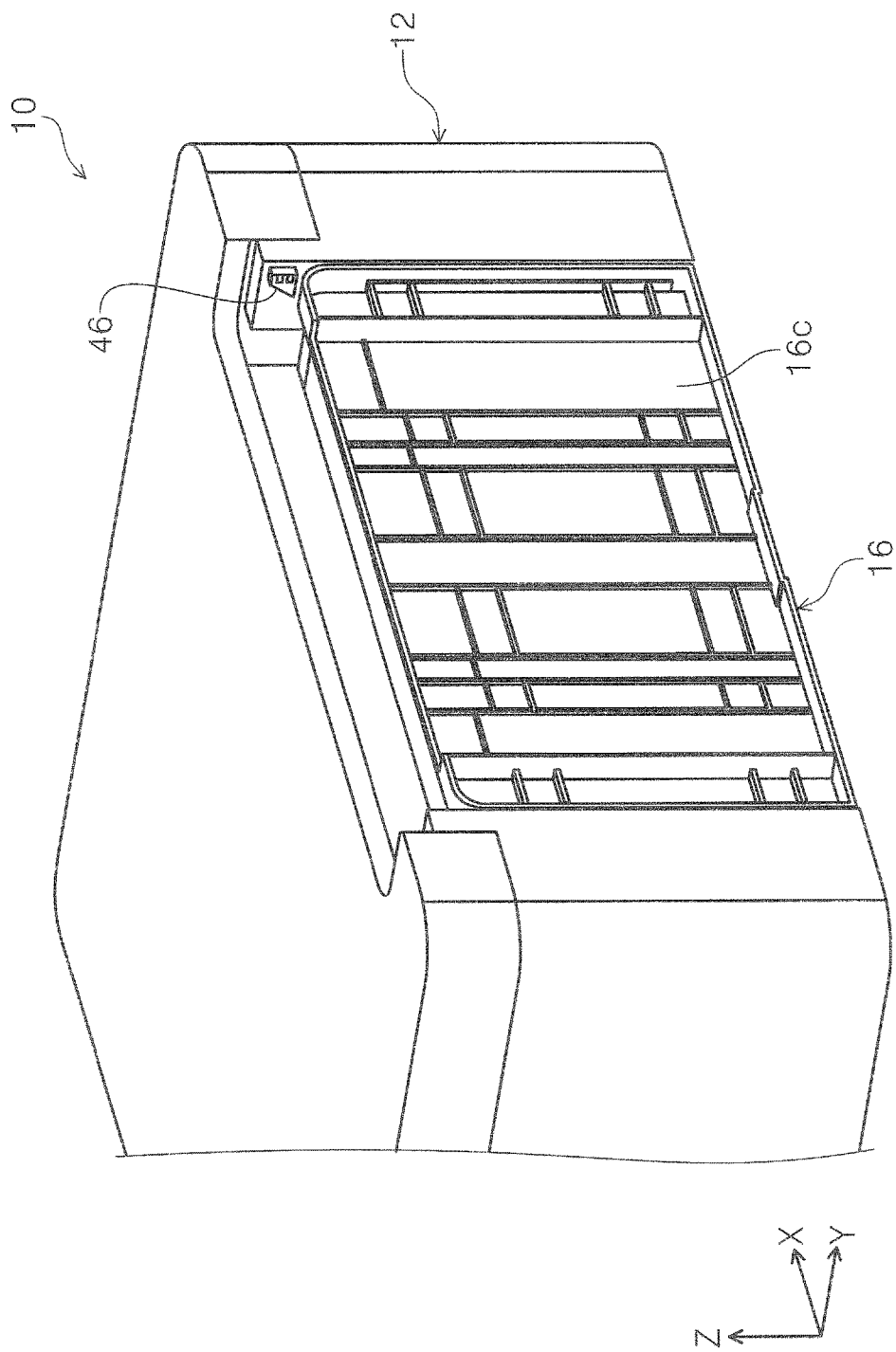
FIG. 4 is a rear perspective view, taken from behind the rear of the printer body, of a state in which the supporting tray is housed in the rear of the printer body.
Figure 5:
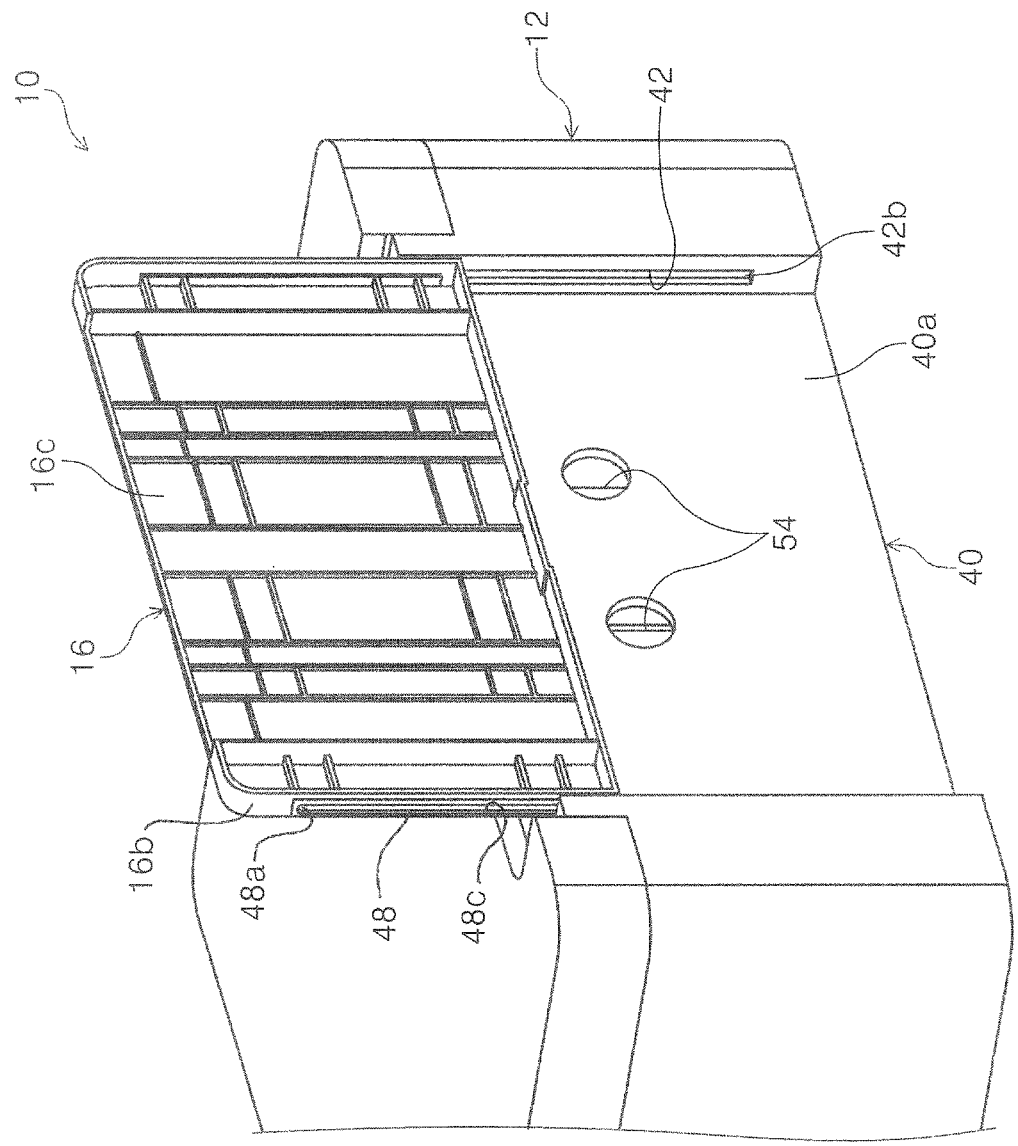
FIG. 5 is a rear perspective view, taken from behind the rear of the printer body, of a state after the supporting tray has been drawn out from the printer body.
Figure 6:
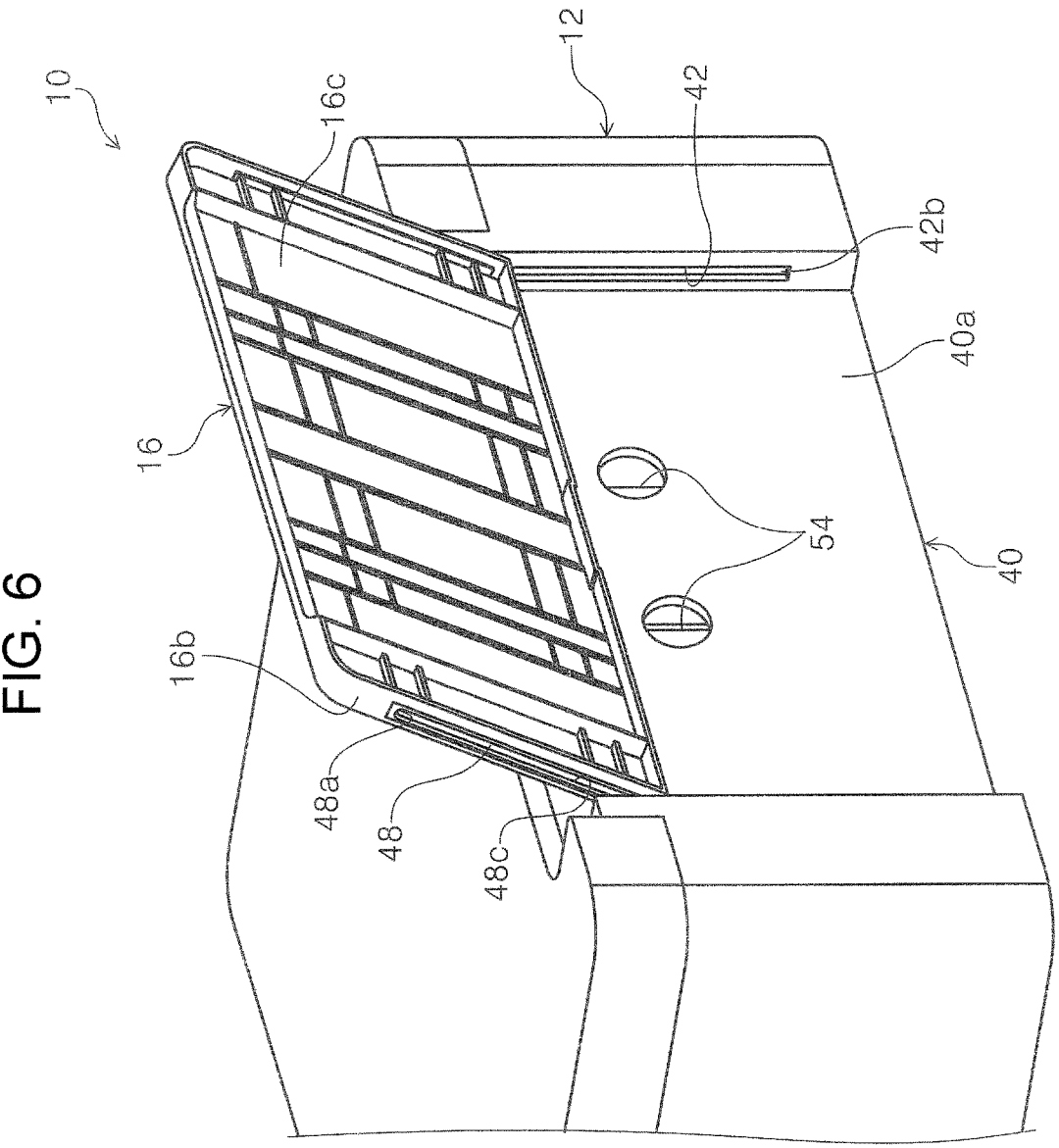
FIG. 6 is a rear perspective view of the printer body after the supporting tray has been drawn out from the printer body and put into a state of being able to support a medium.

FIG. 1 is a perspective view of a printer according to an embodiment of the invention, with a supporting tray housed in the rear of the body of the printer. FIG. 2 is a perspective view of a state after the supporting tray has been drawn out from the body of the printer. FIG. 3 is a side sectional view of a medium transportation path in a printer according to an embodiment of the invention. FIG. 4 is a rear perspective view, taken from behind the rear of the printer body, of a state in which the supporting tray is housed in the rear of the printer body. FIG. 5 is a rear perspective view, taken from behind the rear of the printer body, of a state after the supporting tray has been drawn out from the printer body. FIG. 6 is a rear perspective view of the printer body after the supporting tray has been drawn out from the printer body and put into a state of being able to support a medium.

Figure 7:
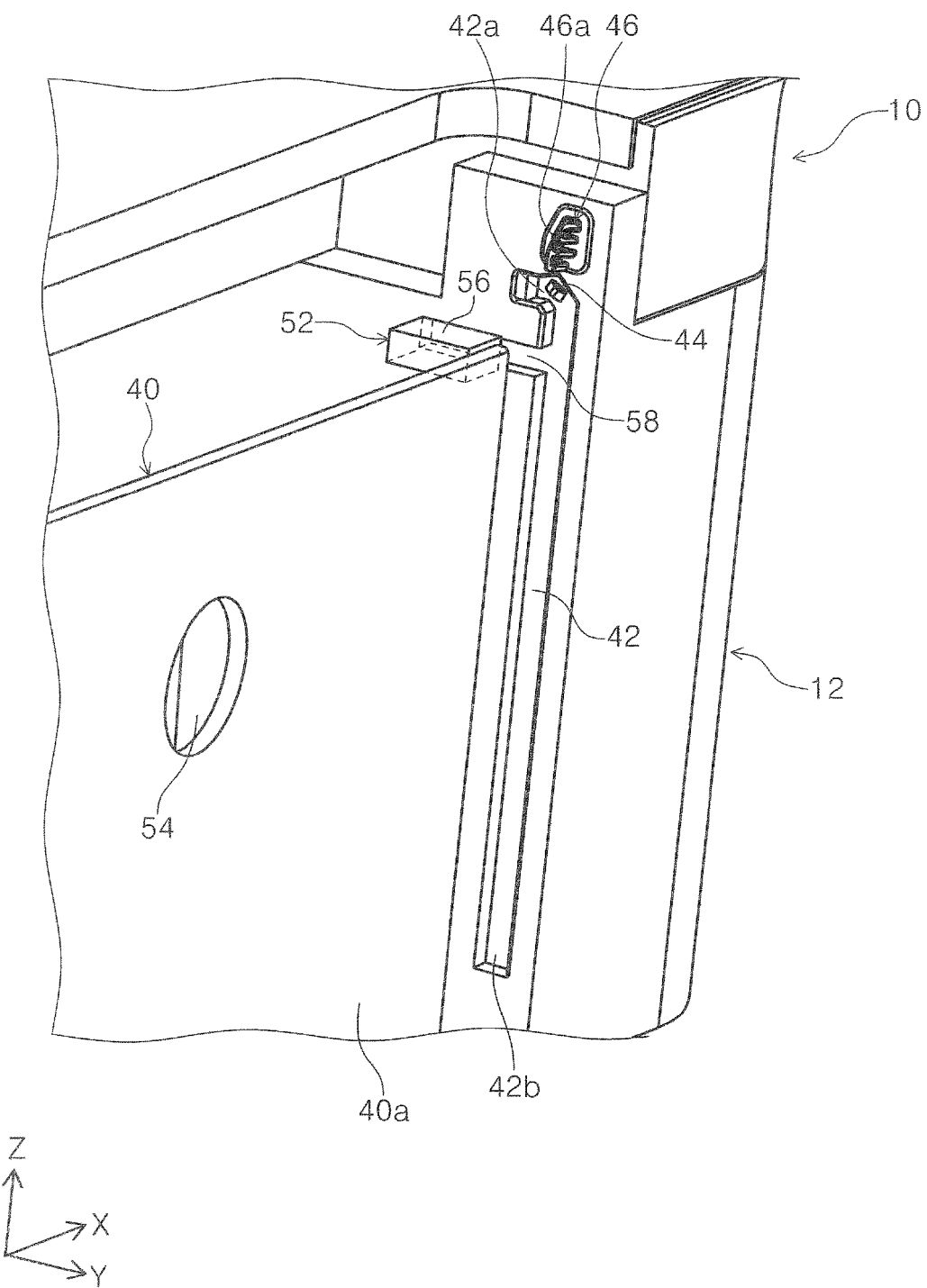
FIG. 7 is a perspective view of a first guide provided in the rear of the printer body for guiding the supporting tray.
Figure 8:
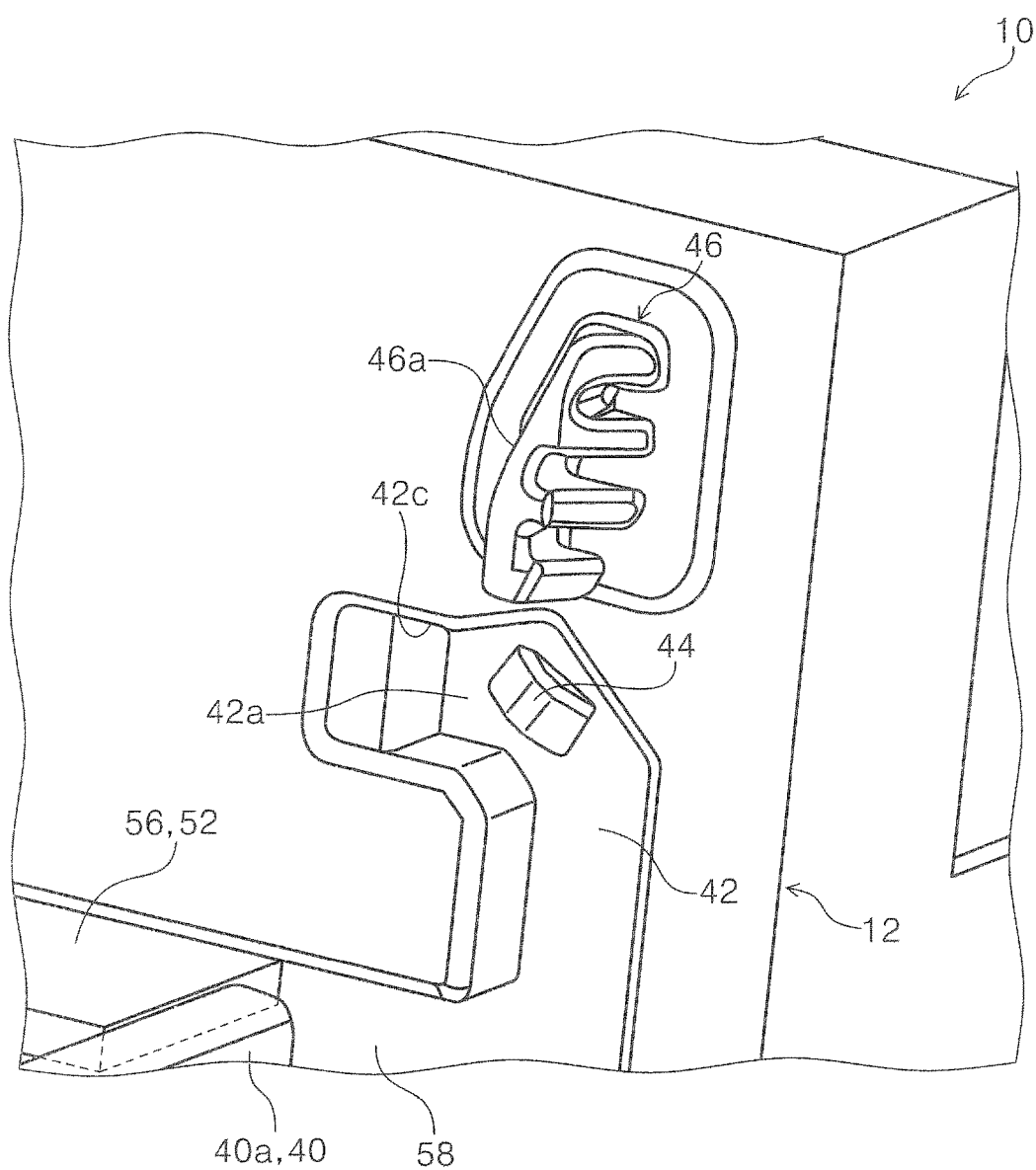
FIG. 8 is a perspective view of an engaging portion configured to engage with the supporting tray on the rear of the printer body and support the supporting tray in a tilted state.
Figure 9:
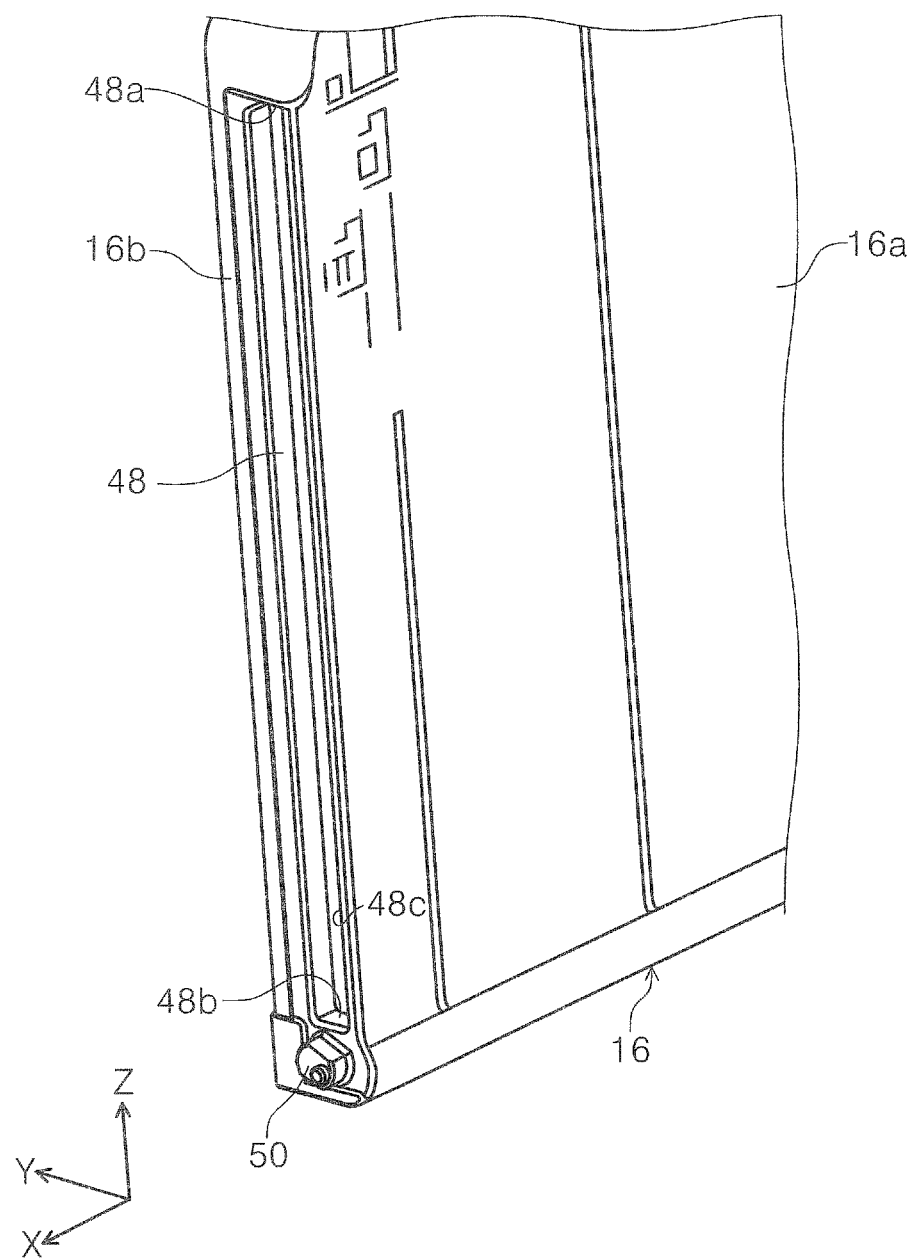
FIG. 9 is a perspective view of a side of the supporting tray.
Figure 10:
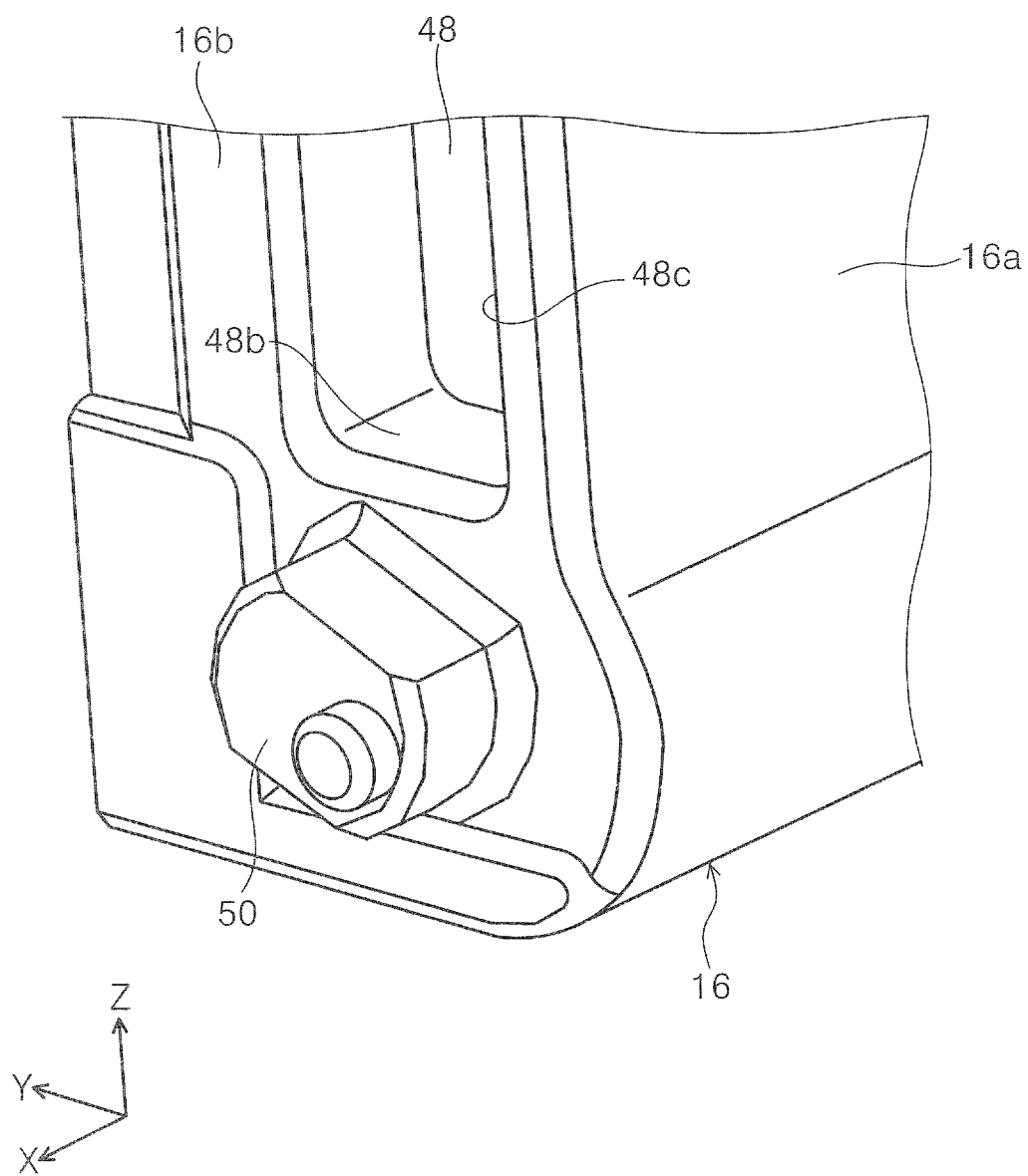
FIG. 10 is a perspective view of a boss that is able to be in engagement, on the supporting tray, with the engaging portion of the printer body.
Figure 11:
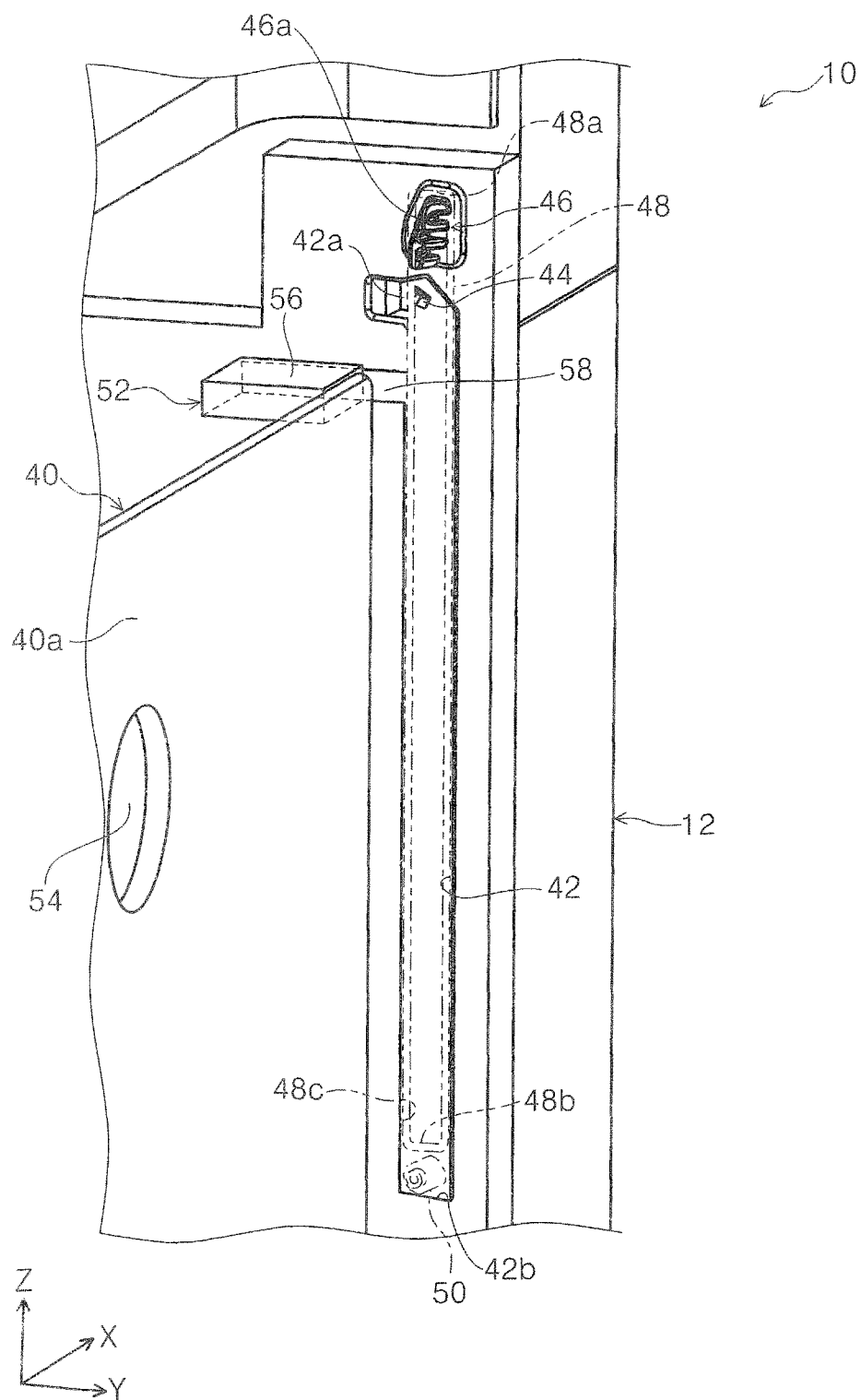
FIG. 11 is a perspective view illustrating a relationship between the first guide of the printer body and the boss in a state in which the supporting tray is in a housed state.
Figure 12:
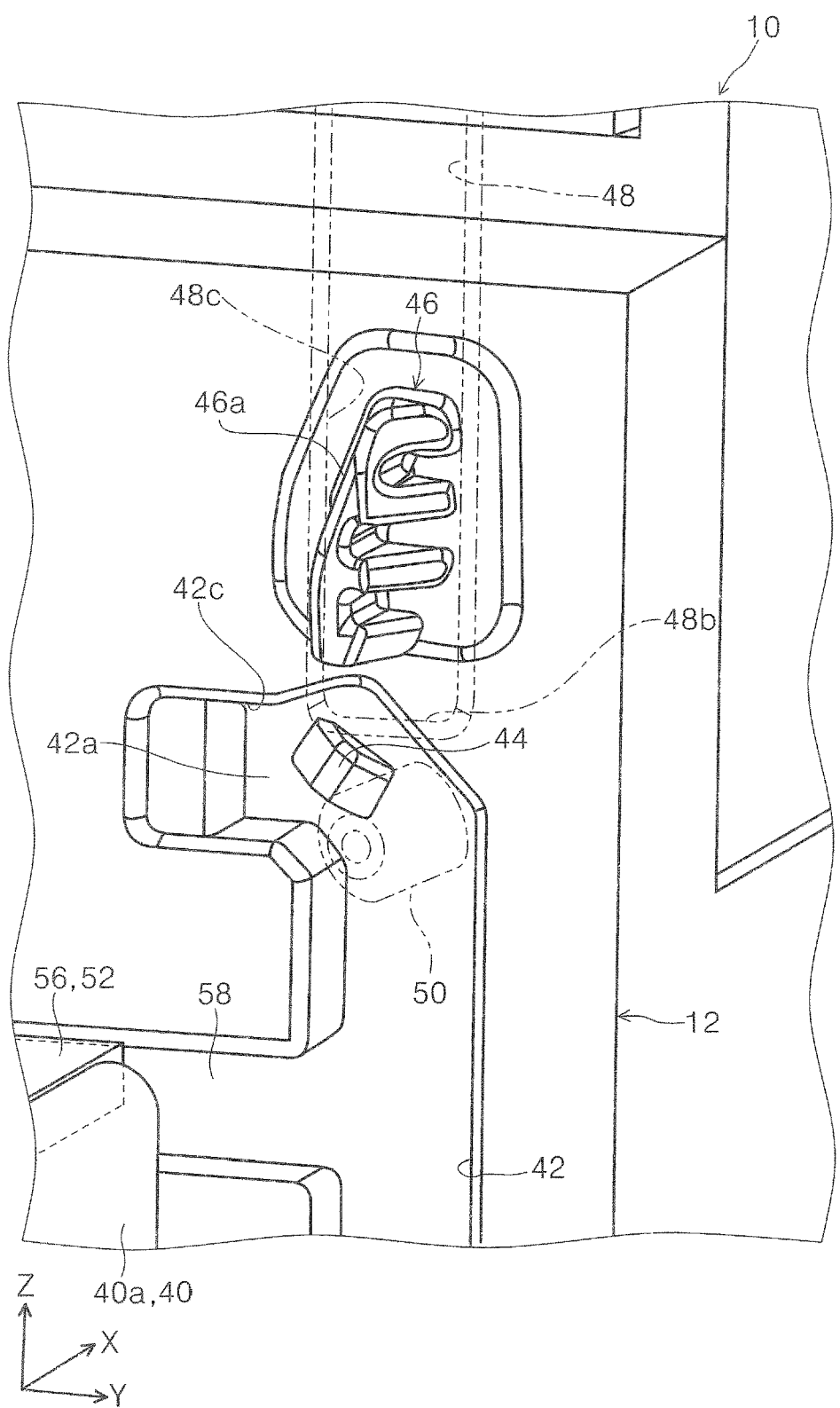
FIG. 12 is a perspective view illustrating a relationship between the engaging portion and the boss in a state after the supporting tray has been drawn out from the printer body.

FIG. 7 is a perspective view of a first guide provided in the rear of the printer body for guiding the supporting tray. FIG. 8 is a perspective view of an engaging portion configured to engage with the supporting tray on the rear of the printer body and support the supporting tray in a tilted state. FIG. 9 is a perspective view of a side of the supporting tray. FIG. 10 is a perspective view of a boss that is able to be in engagement, on the supporting tray, with the engaging portion of the printer body. FIG. 11 is a perspective view illustrating a relationship between the first guide of the printer body and the boss in a state in which the supporting tray is in a housed state. FIG. 12 is a perspective view illustrating a relationship between the engaging portion and the boss in a state after the supporting tray has been drawn out from the printer body.

Figure 13:
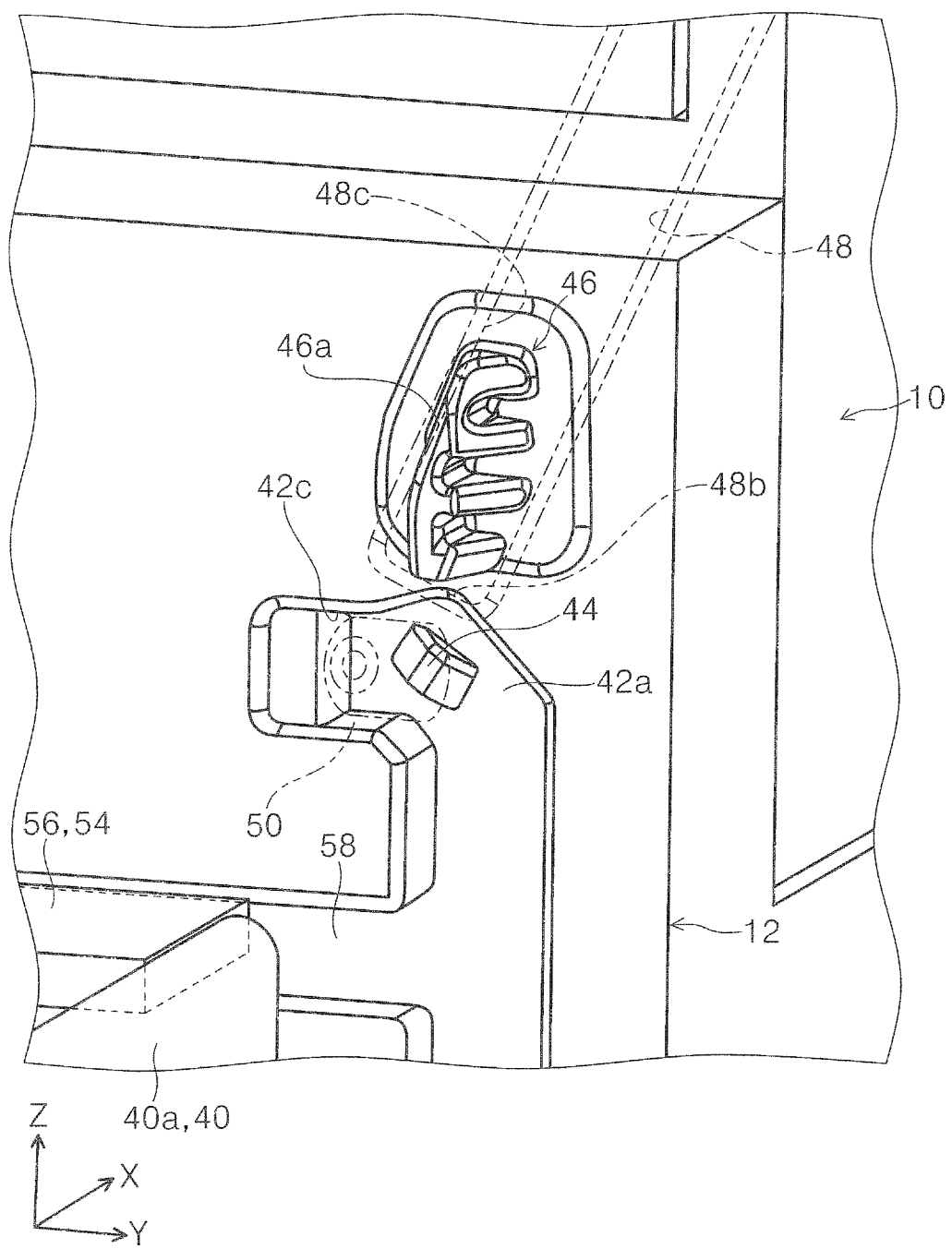
FIG. 13 is a perspective view illustrating a relationship between the engaging portion and the boss in a state after the supporting tray has been drawn out from the printer body and put into a state of being able to support a medium.
Figure 14:
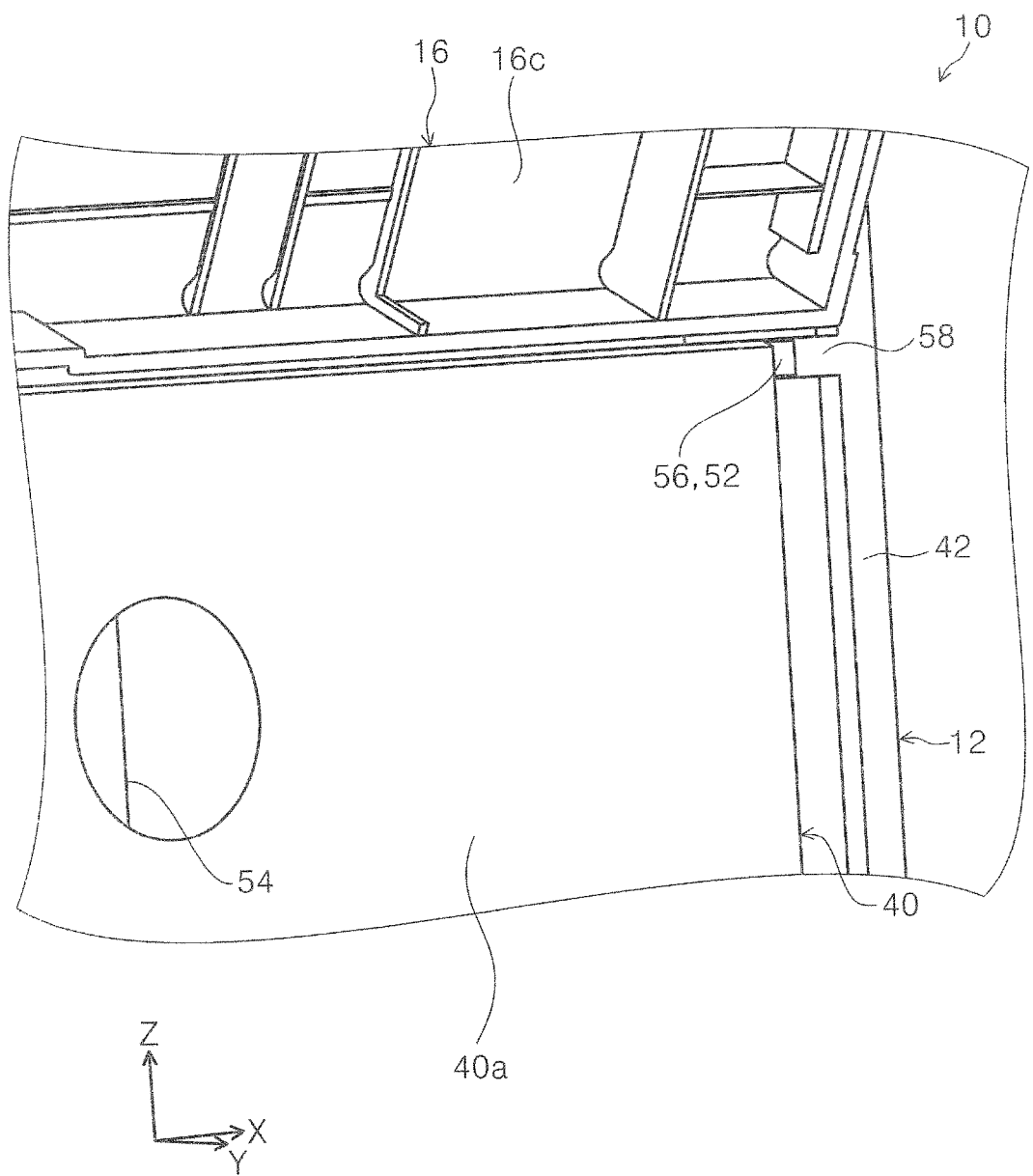
FIG. 14 is a perspective view of a state of retraction of a stopper pushed into the printer body by a unit.
Figure 15:
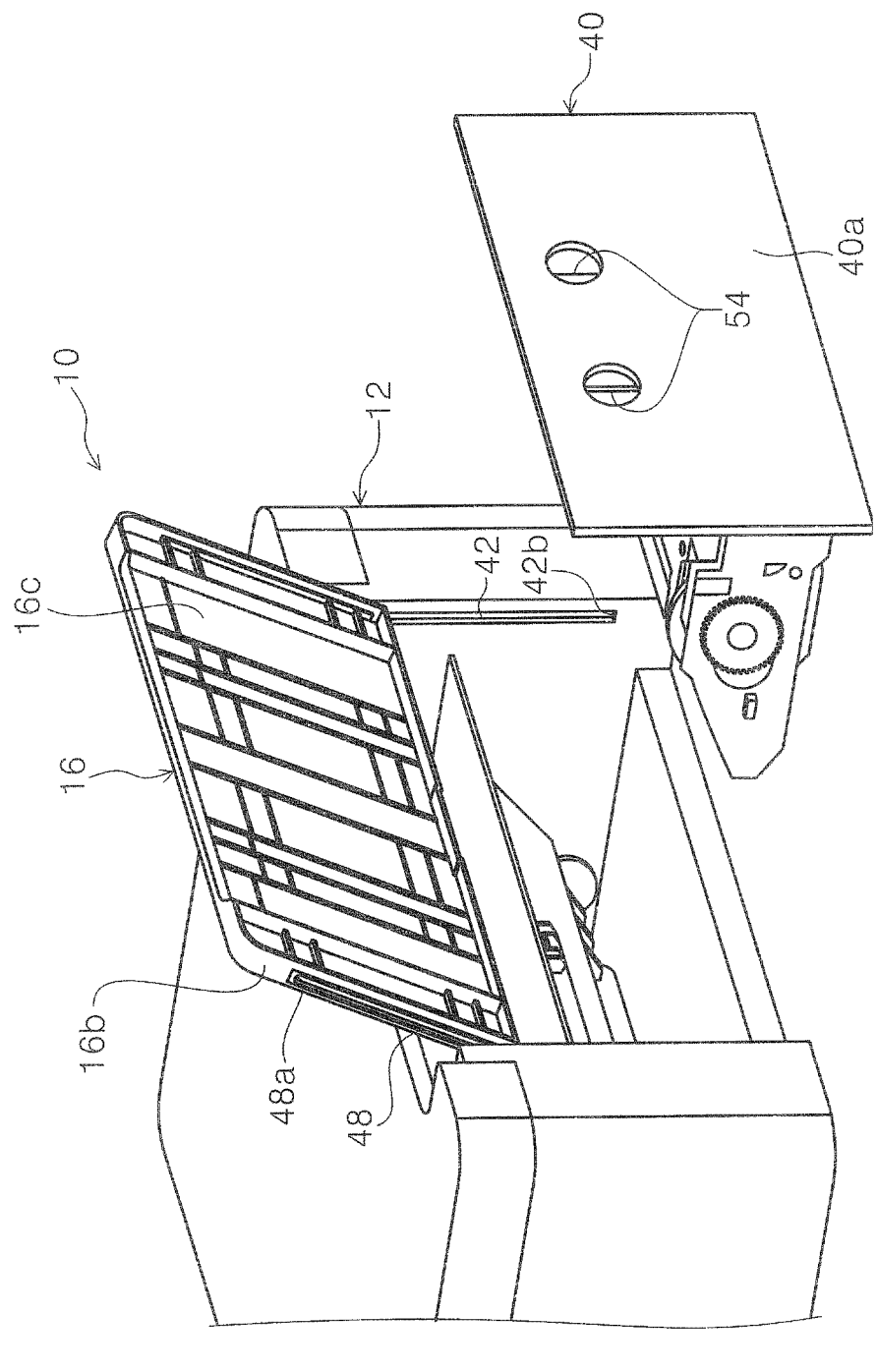
FIG. 15 is a perspective view of a state of detachment of the unit from the printer body.
Figure 16:
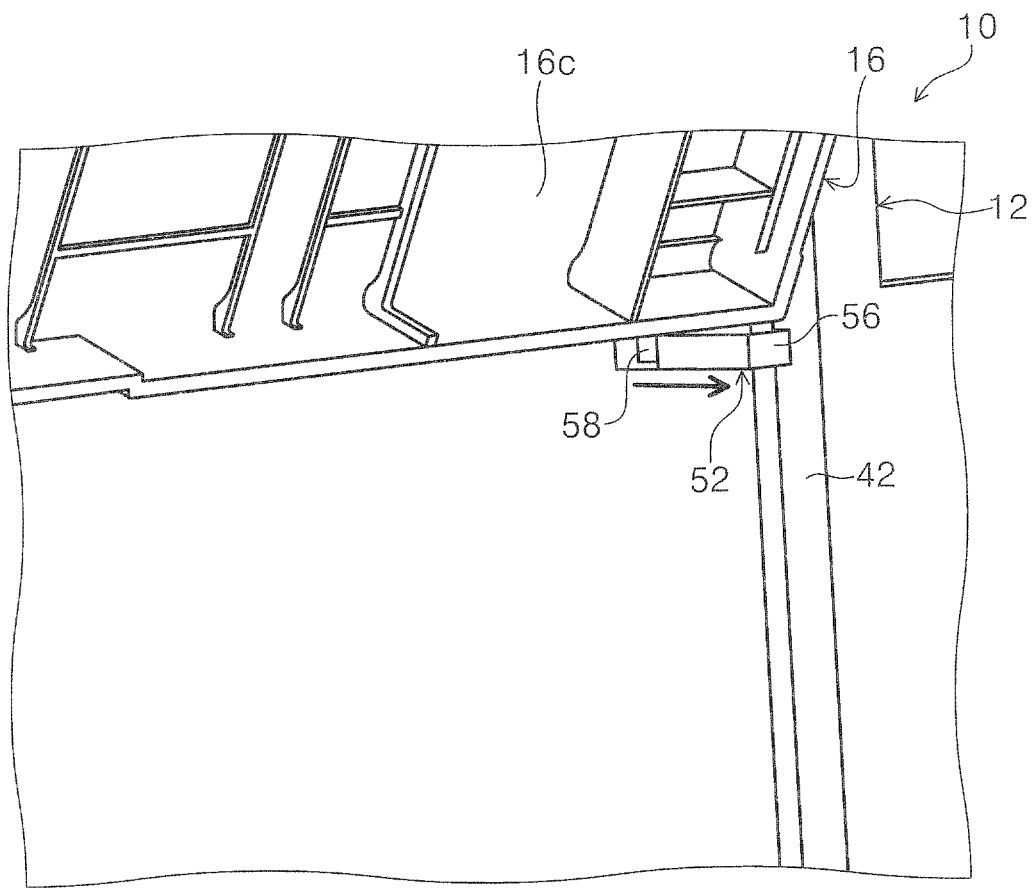
FIG. 16 is a perspective view of a state of advancement of the stopper into the first guide.
Figure 17:
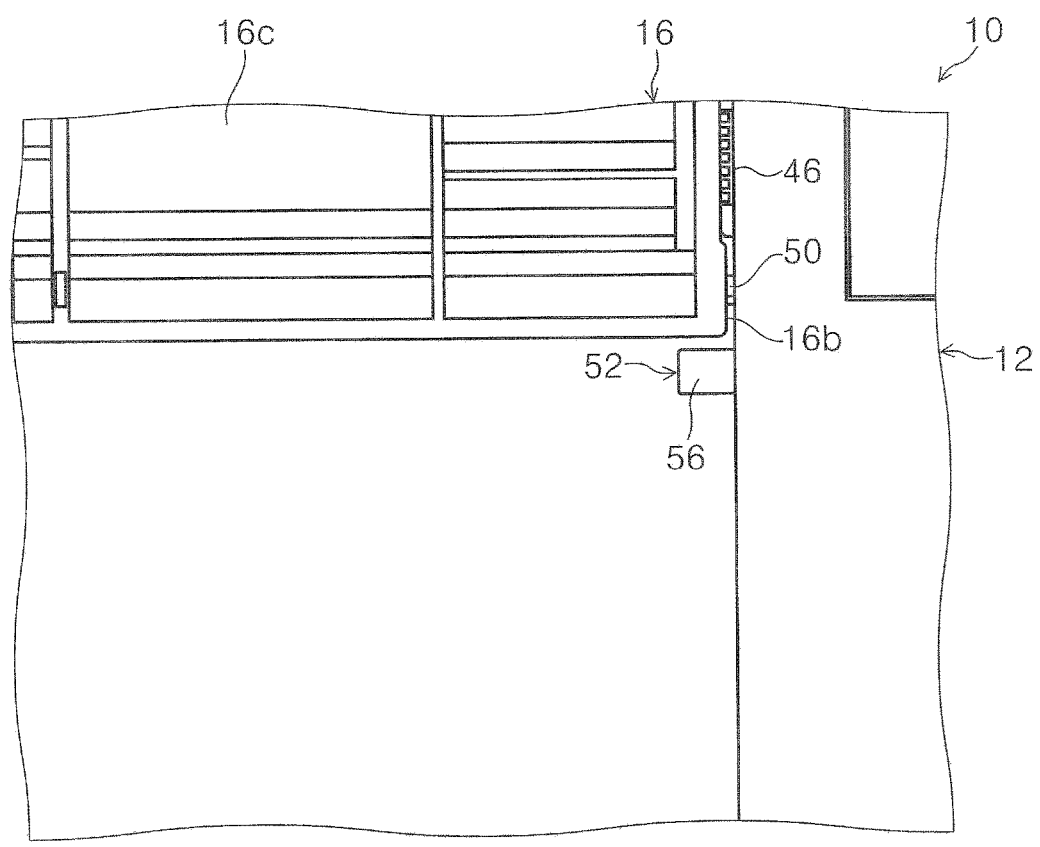
FIG. 17 is a rear view of a state of advancement of the stopper into the first guide.

FIG. 13 is a perspective view illustrating a relationship between the engaging portion and the boss in a state after the supporting tray has been drawn out from the printer body and put into a state of being able to support a medium. FIG. 14 is a perspective view of a state of retraction of a stopper pushed into the printer body by a unit. FIG. 15 is a perspective view of a state of detachment of the unit from the printer body. FIG. 16 is a perspective view of a state of advancement of the stopper into the first guide. FIG. 17 is a rear view of a state of advancement of the stopper into the first guide.

The X-Y-Z coordinate system shown in each of the accompanying drawings is defined as follows. The X direction represents the main scan direction (movement direction) of a carriage, that is, the direction of the width of the recording apparatus. The Y direction represents the direction in which the medium is transported, that is, the direction of the depth of the recording apparatus. The Z direction represents the direction of the height of the recording apparatus. In each of the accompanying drawings, the +X directional side corresponds to the left-hand side of the apparatus, and the −X directional side corresponds to the right-hand side of the apparatus. The +Y direction corresponds to the direction toward the rear of the apparatus, and the −Y direction corresponds to the direction toward the front of the apparatus. Similarly, the +Z direction corresponds to the direction toward the top of the apparatus, and the −Z direction corresponds to the direction toward the bottom of the apparatus.

Overview of Printer

With reference to FIGS. 1, 2, and 3, a schematic overall structure of a printer 10, which is an example of a "recording apparatus" according to an aspect of the invention, will now be explained. The printer 10 has a machine body 12. The printer body 12 has a medium exit 14 in its front in the depth direction. A supporting tray 16 is provided on the rear of the printer body 12 in the depth direction.

The supporting tray 16 is able to be set into a housed state (see FIG. 1) and a drawn-out tilted state (see FIG. 2) in a switchable manner. In the former state, the supporting tray 16 has been put into the rear of the printer body 12. In the latter state, the supporting tray 16 having been drawn out from the printer body 12 is able to support sheets of a medium. Switching between the housed state and the drawn-out state of the supporting tray 16 will be described later in detail.

With reference to FIG. 3, a medium transportation path 18 in the printer 10 will now be explained. In FIG. 3, the thick solid line denoted as P represents the transportation path of a medium transported in the printer 10. In FIG. 3, the supporting tray 16 is tilted rearward in the direction of the depth of the printer body 12 so as to be able to support sheets of a medium.

When the supporting tray 16 is in the drawn-out state in relation to the printer body 12, a medium setting entrance 20 is open at a back region in the direction of the depth of the printer body 12. The medium set on the supporting tray 16 is fed into the printer body 12 through the entrance 20.

As viewed in the medium transportation direction, a feeder roller 22, a transportation roller pair 24, a recording section 26, and an eject roller pair 28 are provided in this order downstream of the supporting tray 16 along the medium transportation path 18. The recording section 26 includes a carriage 30, a recording head 32, and a medium guiding member 34. The recording head 32 is an example of a "recording device".

The carriage 30 is configured to be able to reciprocate in the printer width direction. The recording head 32 is provided on the bottom of the carriage 30 and is configured to be able to eject ink downward in the printer height direction.

The medium guiding member 34 extending in the printer width direction is provided below the carriage 30 in the printer height direction. The medium guiding member 34 faces the recording head 32 at, at least, a part of the movement area of the carriage 30 in the printer width direction.

The medium set on the supporting tray 16 is sent by means of the feeder roller 22 and the transportation roller pair 24 to the area facing the recording head 32 of the recording section 26. The medium guiding member 34 supports the back of the sheet of the medium arriving at the area facing the recording head 32. To perform recording on the recording target surface (front) of the sheet of the medium facing the recording head 32, ink is ejected through nozzle orifices of the recording head 32. After recording, the medium is sent to the exit 14 by the eject roller pair 28 and goes out of the printer 10 frontward in the printer depth direction.

A reverse roller 36 and driven rollers 38a, 38b, and 38c are provided inside the printer body 12 behind the transportation roller pair 24 in the printer depth direction. The driven rollers 38a, 38b, and 38c are located around the reverse roller 36. The reverse roller 36 and the driven rollers 38a, 38b, and 38c are provided in a unit 40, which is a component detachably attached to the printer body 12. The unit 40 will be described later.

If the transportation roller pair 24 and the eject roller pair 28 are rotated in the reverse direction after the completion of recording onto the front of the sheet of the medium by the recording section 26, the medium is sent back toward the reverse roller 36, which is located behind the transportation roller pair 24 in the printer depth direction. Then, the medium is nipped by the reverse roller 36 and the driven rollers 38a, 38b, and 38c sequentially and is sent toward the recording section 26 again. In this process, the medium is reversed by the reverse roller 36. Next, recording onto the back of the sheet of the medium is performed by the recording section 26. After the completion of recording onto the back, the medium is driven by the eject roller pair 28 to go out of the printer 10 through the medium exit 14 frontward in the printer depth direction.

Next, with reference to FIGS. 4 to 17, the structure of the supporting tray 16, and the position switching of the supporting tray 16, will now be explained. The supporting tray 16 is switchable between a housed state and a drawn-out state. Specifically, the supporting tray 16 housed in the rear of the printer body 12 as illustrated in FIG. 4 is able to be drawn out from the printer body 12 by being slid upward in the printer height direction. As illustrated in FIGS. 5 and 6, the supporting tray 16 having been drawn out from the printer body 12 is able to take an erect position and a tilted position in a switchable manner. In the erect position, the supporting tray 16 is upright in relation to the printer body 12. In the tilted position, the supporting tray 16 is inclined in relation to the printer body 12 and is able to support sheets of a medium.

As illustrated in FIGS. 7 and 8, first guides 42, which are elongated in the printer height direction, are provided in internal side walls in the rear of the printer body 12. The upper end of the first guide 42 in the printer height direction is bent frontward in the printer depth direction. A protrusion 44 is provided on the upper end region 42a of the first guide 42. An engaging surface 42c extending in the printer depth direction is provided on the upper end region 42a.

An engaging portion 46 is provided above the upper end region 42a of the first guide 42 in the printer height direction. The engaging portion 46 has an engaging surface 46a, which is sloped rearward in the printer depth direction and upward in the printer height direction. The first guide 42 functions as a state transition path for switching between the housed state and the drawn-out state of the supporting tray 16.

Although the left first guide 42 and the left engaging portion 46 (as viewed from the front) on one internal side only in the rear of the printer body 12 in the printer width direction are illustrated in FIGS. 7 and 8, the right internal side in the rear of the printer body 12 in the printer width direction has the same structure as that of the illustrated counterpart.

Supporting Tray

With reference to FIGS. 9 and 10, the structure of the supporting tray 16 will now be explained. In the explanation given below with reference to FIGS. 9 and 10, regarding the positional state of the supporting tray 16, it is assumed that the supporting tray 16 is at the housed position on the rear of the printer body 12. The supporting tray 16 is a flat plate member. The supporting tray 16 includes, in addition to its sides 16b and back 16c, a medium-supporting portion 16a, which supports sheets of a medium, functioning as "a portion that is configured to be on the path of attachment and detachment of the unit 40" (see FIGS. 4, 5, and 6). When the supporting tray 16 is housed in the rear of the printer body 12 as illustrated in FIG. 4, the back 16c constitutes a part of the exterior of the printer, together with the housing of the printer body 12.

Second guides 48, which are elongated in the printer height direction as illustrated in FIG. 9, are provided in the sides 16b of the supporting tray 16. The second guide 48 is formed as the recessed portion of the side 16b. A boss 50 protruding from the side 16b in the printer width direction is provided below the second guide 48 in the printer height direction. Although the left second guide 48 and the left boss 50 on one side 16b of the supporting tray 16 in the printer width direction are illustrated in FIG. 9, the right side 16b in the printer width direction has the same structure as that of the illustrated counterpart.

In a state in which the supporting tray 16 is attached to the printer body 12 (see FIG. 11), on each side, the boss 50 of the supporting tray 16 is inserted in the first guide 42 in such a way as to be able to move in relation to the first guide 42. On each side, the engaging portion 46 of the printer body 12 is inserted in the second guide 48 provided in the side 16b of the supporting tray 16 in such a way as to allow the movement of the second guide 48 in relation to the engaging portion 46 itself. As illustrated in FIG. 11, in a state in which the supporting tray 16 has been put into the rear of the printer body 12, on each side, the boss 50 is located at the lower end 42b of the first guide 42, and the engaging portion 46 of the printer body 12 is located at the upper end 48a of the second guide 48. In FIGS. 11, 12, and 13, the supporting tray 16 is not illustrated, except for dot-dot-dash illustration of the second guide 48 and the boss 50.

When the supporting tray 16 is drawn out from the printer body 12 upward in the printer height direction to be put into the erect state (see FIG. 5) from the housed state (see FIG. 4), on each side, the boss 50 moves from the lower end 42b to the upper end 42a inside the first guide 42, and the position of the engaging portion 46 shifts from the upper end 48a to the lower end 48b of the second guide 48 (see FIG. 12).

When the supporting tray 16 is rotated rearward in the printer depth direction from the erect position (see FIG. 5) with respect to the printer body 12, the supporting tray 16 pivots on the boss 50 on each side as illustrated in FIG. 13. In this process, the boss 50 rotates while running up onto the protrusion 44 in the upper end region 42a of the first guide 42. Then, the boss 50 comes into abutment with the engaging surface 42c of the upper end 42a. Because of the abutment, further rotation of the supporting tray 16 rearward in the printer depth direction is not allowed. In addition, by running up onto the protrusion 44, the boss 50 locks the supporting tray 16 in the tilted state. For release from the locked state, the supporting tray 16 is rotated frontward in the printer depth direction from the tilted position; in this process, the boss 50 runs off the protrusion 44 to unlock the supporting tray 16.

When the supporting tray 16 is rotated rearward in the printer depth direction, on each side, the second guide 48 of the supporting tray 16 rotates in relation to the engaging portion 46 of the printer body 12. Upon the abutment of the boss 50 with the engaging surface 42c, the front-side wall 48c of the second guide 48 in the printer depth direction comes into contact with the engaging surface 46a of the engaging portion 46. The engaging portion 46 supports the tilted supporting tray 16. The supporting tray 16 switches from the erect position (see FIG. 5) to the tilted position (see FIG. 6) in this way.

Relationship Between Unit and Keeping Device

Next, with reference to FIGS. 14 to 17, a relationship between a unit 40 and a keeping device 52 will now be explained. As illustrated in FIG. 15, the unit 40 includes the reverse roller 36 and the driven rollers 38a, 38b, and 38c in its front portion and includes a rear plate 40a at its end. The unit 40 is configured to be able be attached to the printer body 12 from behind the rear of the printer body 12, and detached therefrom.

A pair of operation members 54 is provided in the rear end 40a of the unit 40. A locking member (not illustrated) configured to keep the unit 40 attached to the printer body 12 is provided in the printer body 12 or on the unit 40. The lock of the unit 40 to the printer body 12 by the locking member is released when the operation members 54 constituting the pair are pushed toward each other, that is, toward the center in the printer width direction, with the unit 40 attached to the printer body 12. The unlocking enables the user to detach the unit 40 from the printer body 12.

As illustrated in FIG. 4, when the supporting tray 16 is in a housed state by having been put into the rear of the printer body 12, the unit 40 is attached to the printer body 12, with the rear end 40a covered by the supporting tray 16. That is, in this state, the supporting tray 16 is positioned behind the rear end 40a of the unit 40 in the printer depth direction and on the path of attachment and detachment of the unit 40. The operation members 54 provided in the rear end 40a are also covered by the supporting tray 16. Therefore, the operation members 54 are not touchable in this state.

The rear end 40a of the unit 40 becomes exposed when the supporting tray 16 is drawn out from the printer body 12 upward in the printer height direction as illustrated in FIGS. 5 and 15. The exposure enables the user to operate the operation members 54.

The user operates the operation members 54 to unlock the unit 40 from the printer body 12. In this state, the supporting tray 16 has been drawn out upward in the printer height direction from the position behind the unit 40 in the printer depth direction, meaning that the supporting tray 16 is out of the way. Therefore, the user is able to draw the unit 40 out of the printer body 12 rearward in the printer depth direction.

Next, with reference to FIGS. 7 and 14, the keeping device 52 will now be explained. The keeping device 52 includes a stopper 56. The keeping device 52 further includes an urging device that is not illustrated. The printer body 12 has a groove 58. The groove 58 extends in the printer depth direction orthogonally to the first guide 42. The groove 58 is located below the upper end region 42a of the first guide 42 in the printer height direction. The stopper 56 is configured to be able to move forward and backward in the printer depth direction along the groove 58 extending orthogonally to the first guide 42. The non-illustrated urging device urges the stopper 56 rearward in the printer depth direction, that is, in the direction of causing the stopper 56 to protrude into the first guide 42, which is the state transition path of the supporting tray 16.

When the unit 40 is attached to the printer body 12, the stopper 56 is in contact with the rear end 40a of the attached unit 40. Accordingly, the stopper 56 is in a state of being pushed into the printer body 12 frontward in the printer depth direction by the rear end 40a against the urging force of the non-illustrated urging device.

In this state, the stopper 56 is pushed to a retracted position away from the first guide 42 by the unit 40 in the printer depth direction. Therefore, the stopper 56 does not obstruct the relative movement of the boss 50 of the supporting tray 16 inside the first guide 42. That is, the supporting tray 16 is able to change its position on the printer body 12 in the printer height direction behind the unit 40.

As illustrated in FIGS. 15, 16, and 17, when the unit 40 is detached from the printer body 12, due to the urging force of the non-illustrated urging device, the stopper 56 moves rearward in the printer depth direction to advance into the first guide 42. Then, the stopper 56 restricts the movement of the boss 50 inside the first guide 42.

As illustrated in FIG. 17, in a state of advancement of the stopper 56 into the first guide 42 (see FIG. 16), the stopper 56 overlaps with at least a part of the supporting tray 16 in the printer width direction. When the supporting tray 16 switches from the tilted state (see FIG. 6) to the erect state (see FIG. 5) by being rotated frontward in the printer depth direction and thereafter changes its position along the first guide 42 downward in the printer height direction, the supporting tray 16 comes into contact with the stopper 56. The stopper 56 does not allow a further change in the position of the supporting tray 16 downward in the printer height direction, and supports the supporting tray 16. The stopper contact prevents the drawn-out supporting tray 16 from switching into the state of being housed in the printer body 12 when the unit 40 is not attached to the printer body 12.

The stopper 56 retracts away from the first guide 42 due to the attachment of the unit 40 to the printer body 12. The stopper retraction enables the drawn-out supporting tray 16 to switch into the state of being housed in the printer body 12.

The foregoing description is summarized as follows. Even if the unit 40 is detached from the printer body 12 when sheets of a medium are supported by the supporting tray 16 that is in the tilted position, the supporting tray 16 remains to be drawn out of the printer body 12 and, therefore, it is possible to keep the medium set on the supporting tray 16. When the supporting tray 16 is not in use, that is, in the state of being housed in the printer body 12, the medium-supporting portion 16a of the supporting tray 16 is located behind the rear end 40a of the unit 40 in the printer depth direction. Since the operation members 54 of the unit 40 are covered by the supporting tray 16 in this state, it is possible to prevent the unit 40 from being detached inadvertently.

Since the inside of the printer body 12 does not become accessible as a result of careless detachment of the unit 40 from the printer body 12, it is possible to prevent parts provided inside the printer body 12 from being damaged. Moreover, it is possible to avoid a risk of damage of the unit 40 detached from the printer body 12, for example, damage due to dropping.

Since the stopper 56 of the keeping device 52 supports the supporting tray 16 when the unit 40 is not attached to the printer body 12, it is possible to prevent the supporting tray 16 from switching into the state of being housed in the printer body 12. Since the drawn-out supporting tray 16 is not allowed to move into the state of being housed in the printer body 12 when the unit 40 is not attached to the printer body 12, the exemplary structure described above saves the trouble of drawing the supporting tray 16 out again at the time of attachment of the unit 40 to the printer body 12 and the trouble of setting a medium on the supporting tray 16.

Since the supporting tray 16 is provided on the printer body 12 in the present embodiment, it is possible to avoid an increase in the size of the unit 40, which is inserted into, and taken out of, the printer body 12, thereby reducing user's burden of attachment of the unit 40 to, and detachment of the unit 40 from, the printer body 12.

Variation Examples of Embodiments

In the embodiment described above, the keeping device 52 causes the stopper 56 to move forward toward, and backward away from, the first guide 42 along the groove 58 extending in the printer depth direction. The structure of the embodiment may be modified as follows. In the process of detachment of the unit 40 from the printer body 12, a convex portion (e.g., pins) advances to protrude into the first guide 42 in the printer width direction to support the supporting tray 16. In the process of attachment of the unit 40 to the printer body 12, the convex portion retracts away from the first guide 42.

In the embodiment described above, almost the entirety of the supporting tray 16 is configured to be on the path of attachment and detachment of the unit 40. However, only a part of the supporting tray 16 may be configured to be on the path of attachment and detachment of the unit 40.

The foregoing description is summarized as follows. The printer 10 comprises: the printer body 12; the recording head 32 that is provided inside the printer body 12 and performs recording on a medium; the supporting tray 16 that is switchable between a drawn-out state and a housed state and, when in the drawn-out state, supports the medium that is to be fed toward the recording head 32, the drawn-out state being a state of being drawn out from the printer body 12, the housed state being a state of being housed in the printer body 12; and the unit 40 that is detachably attached to the printer body 12 and includes the reverse roller 36 for reverse the medium, wherein the supporting tray 16 has the medium-supporting portion 16a that is a portion configured to be on the path of attachment and detachment of the unit 40 when in the housed state.

In the above structure, the supporting tray 16 has the medium-supporting portion 16a that is a portion configured to be on the path of attachment and detachment of the unit 40 when in the housed state. Therefore, the supporting tray 16 obstructs the detachment of the unit 40 when in the housed state, that is, when the apparatus is not in use. The obstruction reduces a risk of excessively-easy careless detachment of the unit 40. Moreover, since the supporting tray 16 serves as an obstruction to excessively-easy careless detachment of the unit 40, as compared with a structure in which a dedicated means is provided for reducing a risk of careless detachment of the unit 40, it is possible to suppress an increase in cost.

Functioning as a portion that is configured to be on the path of attachment and detachment of the unit 40, the medium-supporting portion 16*a* of the supporting tray 16 is located behind the unit 40 attached, when in the housed state. With this structure, it is possible to further reduce a risk of careless detachment of the unit 40.

When in the housed state, the rear of the unit 40 attached is covered by the medium-supporting portion 16*a* (back 16*c*) of the supporting tray 16 functioning as the portion configured to be on the path of attachment and detachment of the unit 40, and the printer body 12 and the supporting tray 16 constitute the exterior of the printer. With this structure, it is possible to reduce the cost of the apparatus because the supporting tray 16 serves as an exterior constituent member.

The unit 40 includes the operation members 54 for unlocking attachment of the unit 40 to the printer body 12, and, when in the housed state, the operation members 54 of the unit 40 attached are covered by the medium-supporting portion 16*a* of the supporting tray 16 functioning as the portion configured to be on the path of attachment and detachment of the unit 40. The operation members 54 are not touchable when the supporting tray 16 is in the housed state. Therefore, with this structure, it is possible to further reduce a risk of careless detachment of the unit 40.

The printer 10 further comprises: the keeping device 52 that keeps the drawn-out state of the supporting tray 16 when the unit 40 is in a state of being detached from the printer body 12. Because of this structure, the supporting tray 16 is not obstructive in the process of attachment of the unit 40. Therefore, the attachment of the unit 40 is easy.

The keeping device 52 includes the stopper 56 that is able to come into abutting contact with the unit 40 and is urged in a direction of advancing toward the first guide 42 functioning as a state transition path that is a path for switching from the drawn-out state to the housed state of the supporting tray 16; the stopper 56 is in abutting contact with the unit 40 and is retracted away from the first guide 42 functioning as the state transition path when the unit 40 is in a state of being attached to the printer body 12; and the stopper 56 advances into the first guide 42 functioning as the state transition path when the unit 40 is detached from the printer body 12. Since the stopper 56 is used as a constituent of the keeping device 52, it is possible to simplify the structure of the keeping device 52 and reduce cost.

When in the drawn-out state, the supporting tray 16 is able to switch between a tilted position that is a position for supporting the medium and an erect position that is a position for transition to the housed state; and, when in the tilted position, the supporting tray 16 is able to remain in the drawn-out state irrespective of a state of the keeping device 52. This structure makes it possible to always support the medium properly irrespective of the state of the keeping device 52.

In the embodiment described above, the unit 40 includes the reverse roller 36 and is detachably attached. However, a reverse path may be provided in the unit 40, and the unit 40 may have an open close structure instead of a detachable attachment structure.

In the embodiment described above, the supporting tray 16 and the keeping device 52 are applied to an ink-jet printer that is an example of a recording apparatus. However, they may be applied to other various kinds of a liquid ejecting apparatus. The term "liquid ejecting apparatus" includes, but not limited to, a recording apparatus such as a printer, a copier, and a facsimile, etc. that includes an ink-jet recording head and performs recording by ejecting ink onto a recording target medium from the head. It further encompasses a variety of apparatuses that ejects, in place of ink, liquid used in its specific application from a liquid ejecting head corresponding to an ink-jet recording head onto a liquid ejection target medium corresponding to a recording target medium so as to put the liquid onto the medium.

Examples of a liquid ejecting head are: a recording head mentioned above, a color material ejection head used in the production of a color filter for a liquid crystal display, etc.; an electrode material (i.e., conductive paste) ejection head used for the electrode formation of an organic EL display device, a surface/plane emission display (FED), etc.; a living organic material ejection head used for production of biochips; and a sample ejection head that functions as a high precision pipette.

The scope of the invention is not limited to the foregoing embodiments. It may be modified, altered, changed, adapted, and/or improved within the scope of the recitation of appended claims. Needless to say, such a modification, etc. is also within the scope of the invention.

What is claimed is:

1. A recording apparatus, comprising:
    an apparatus body;
    a recording device that is provided inside the apparatus body and performs recording on a medium;
    a supporting tray that is switchable between a drawn-out state and a housed state and, when in the drawn-out state, supports the medium that is to be fed toward the recording device, the drawn-out state being a state of being drawn out from the apparatus body, the housed state being a state of being housed in the apparatus body; and
    a unit that is detachably attached to the apparatus body and includes a reverse roller for reverse the medium, wherein when the unit is detached from the apparatus body, the unit is completely detached from the apparatus body and the reverse roller is removed from being within the apparatus body,
    wherein the supporting tray has a portion that is configured to be on a path of attachment and detachment of the unit when in the housed state,
    wherein when the supporting tray is in the drawn out state, the medium is settable on the supporting tray and the unit can be detached from the apparatus body, and
    wherein when the supporting tray is in the housed state, the unit cannot be detached from the apparatus body.

2. The recording apparatus according to claim 1,
    wherein, when in the housed state, the portion, of the supporting tray, configured to be on the path of attachment and detachment of the unit is located behind the unit attached.

3. The recording apparatus according to claim 2,
    wherein, when in the housed state, rear of the unit attached is covered by the portion, of the supporting tray, configured to be on the path of attachment and detachment of the unit, and the apparatus body and the supporting tray constitute exterior of the apparatus.

4. The recording apparatus according to claim 1,
    wherein the unit includes an operation device that unlocks attachment of the unit to the apparatus body; and
    wherein, when in the housed state, the operation device of the unit attached is covered by the portion, of the supporting tray, configured to be on the path of attachment and detachment of the unit.

5. The recording apparatus according to claim 1,
    wherein the portion configured to be on the path of attachment and detachment of the unit is a supporting surface that supports the medium.

6. The recording apparatus according to claim 1, further comprising:
a keeping device that keeps the drawn-out state of the supporting tray when the unit is in a state of being detached from the apparatus body.

7. The recording apparatus according to claim 6,
wherein the keeping device includes a stopper that is able to come into abutting contact with the unit and is urged in a direction of advancing toward a state transition path that is a path for switching from the drawn-out state to the housed state of the supporting tray;
wherein the stopper is in abutting contact with the unit and is retracted away from the state transition path when the unit is in a state of being attached to the apparatus body; and
wherein the stopper advances into the state transition path when the unit is detached from the apparatus body.

8. The recording apparatus according to claim 6,
wherein, when in the drawn-out state, the supporting tray is able to switch between a tilted position that is a position for supporting the medium and an erect position that is a position for transition to the housed state; and
wherein, when in the tilted position, the supporting tray is able to remain in the drawn-out state irrespective of a state of the keeping device.

9. A recording apparatus, comprising:
an apparatus body;
a recording device that is provided inside the apparatus body and performs recording on a medium;
a supporting tray that is switchable between a drawn-out state and a housed state and, when in the drawn-out state, supports the medium that is to be fed toward the recording device, the drawn-out state being a state of being drawn out upward from the apparatus body height direction, the housed state being a state of being housed in the apparatus body; and
an open close member that is able to open and close in relation to the apparatus body, with a reverse path via which the medium is reversed,
wherein when the supporting tray is in the drawn out state, the medium is settable on the supporting tray and the open close member is able to open and close in relation to the apparatus main body, and
wherein, when in the housed state, the supporting tray is located behind the open close member and the open close member cannot be opened from the apparatus body.

10. A recording apparatus, comprising:
an apparatus body;
a recording device that is provided inside the apparatus body and performs recording on a medium;
a supporting tray that is switchable between a drawn-out state and a housed state and, when in the drawn-out state, supports the medium that is to be fed toward the recording device, the drawn-out state being a state of being drawn out upward from the apparatus body height direction, the housed state being a state of being housed in the apparatus body; and
a unit that is detachably attached to the apparatus body and includes a reverse path for reverse the medium, wherein when the unit is detached from the apparatus body, the unit is completely detached from the apparatus body, wherein the supporting tray has a portion that is configured to be on a path of attachment and detachment of the unit when in the housed state,
wherein when the supporting tray is in the drawn out state, the medium is settable on the supporting tray and the unit can be detached from the apparatus body, and
wherein when the supporting tray is the housed state, the unit cannot be detached from the apparatus body.

* * * * *